US012627142B2

(12) United States Patent
Ren et al.

(10) Patent No.: US 12,627,142 B2
(45) Date of Patent: May 12, 2026

(54) THERMAL-RUNAWAY WARNING METHOD, SYSTEM, AND TERMINAL FOR POWER STATION

(71) Applicant: Makesense Energy Technology Co., Limited., Shanghai (CN)

(72) Inventors: Haowen Ren, Shanghai (CN); Peng Ding, Shanghai (CN); Weikun Wu, Shanghai (CN); Decheng Wang, Shanghai (CN); Yuan Feng, Shanghai (CN); Wei Song, Shanghai (CN); Guopeng Zhou, Shanghai (CN); Zonglin Cai, Shanghai (CN); Xiao Yan, Shanghai (CN); Enhai Zhao, Shanghai (CN)

(73) Assignee: Makesense Energy Technology Co., Limited., Shanghai (CN)

( * ) Notice: Subject to any disclaimer, the term of this patent is extended or adjusted under 35 U.S.C. 154(b) by 332 days.

(21) Appl. No.: 18/370,406

(22) Filed: Sep. 20, 2023

(65) Prior Publication Data

US 2024/0106232 A1     Mar. 28, 2024

(30) Foreign Application Priority Data

Sep. 26, 2022     (CN) .......................... 202211174980.8

(51) Int. Cl.
*H02J 3/00*          (2006.01)
*G05B 13/02*        (2006.01)
*H02J 3/0012*       (2026.01)

(52) U.S. Cl.
CPC .......... *H02J 3/0012* (2020.01); *G05B 13/027* (2013.01)

(58) Field of Classification Search
CPC ............................. H02J 3/0012; G05B 13/027
See application file for complete search history.

(56) References Cited

U.S. PATENT DOCUMENTS

2016/0359329 A1* 12/2016 Kim ..................... H01M 10/425
2020/0097818 A1* 3/2020 Li .......................... G06N 3/0464

* cited by examiner

*Primary Examiner* — Ramsey Refai
(74) *Attorney, Agent, or Firm* — IPRTOP LLC

(57) ABSTRACT

A thermal-runaway warning method, system, and terminal for a power station are provided. The method comprises: obtaining collected data of a battery module comprised in the power station, wherein the collected data comprises collected temperature values of the battery module collected by temperature measuring devices; normalizing the collected data to obtain a standard dataset; training a CNNL-STM-based temperature predicting model based on the standard dataset to obtain a trained CNNLSTM-based temperature predicting model; and obtaining a predicted temperature value of the battery module within an output time window based on the trained CNNLSTM-based temperature predicting model, and determining whether there is a risk of thermal runaway in the power station based on the predicted temperature value. The present disclosed thermal-runaway warning method, system, and terminal for a power station realize effective warning of thermal runaway for a power station by predicting the temperature of battery modules in the power station.

10 Claims, 3 Drawing Sheets

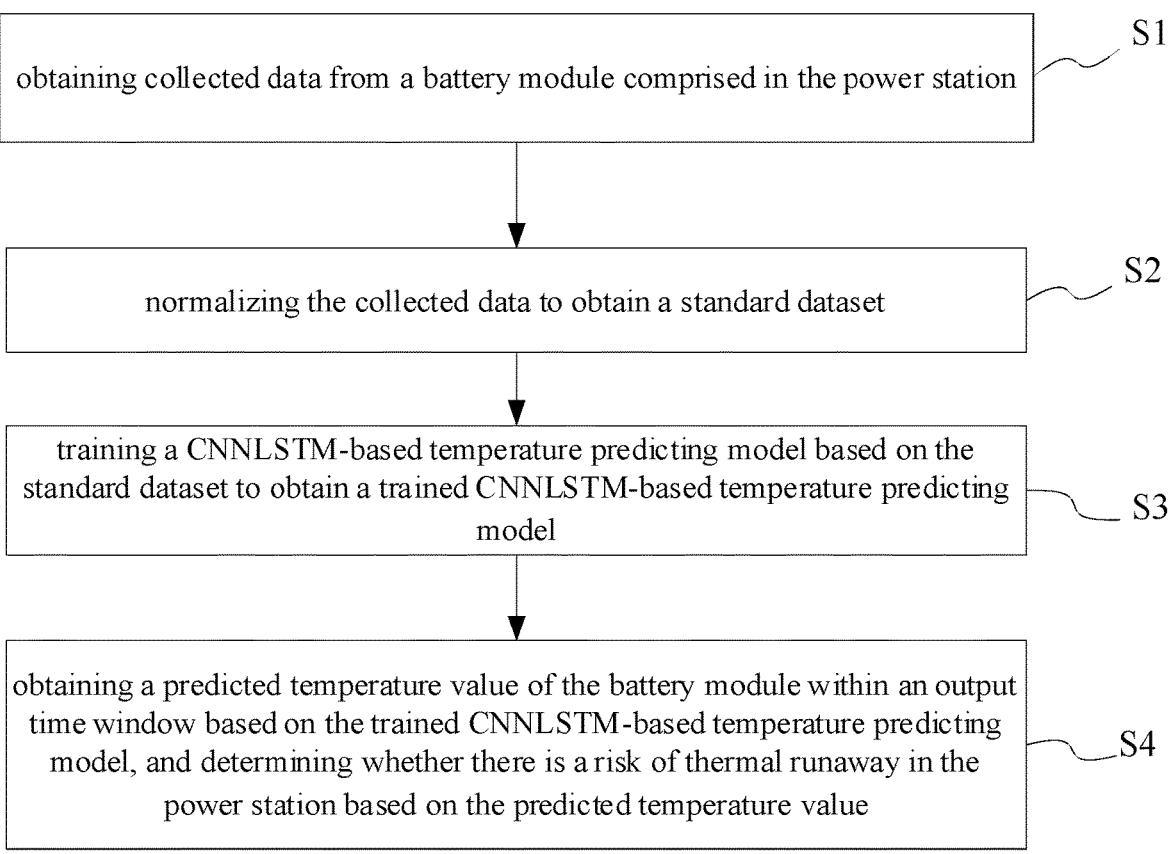

obtaining collected data from a battery module comprised in the power station — S1 normalizing the collected data to obtain a standard dataset — S2 training a CNNLSTM-based temperature predicting model based on the standard dataset to obtain a trained CNNLSTM-based temperature predicting model — S3 obtaining a predicted temperature value of the battery module within an output time window based on the trained CNNLSTM-based temperature predicting model, and determining whether there is a risk of thermal runaway in the power station based on the predicted temperature value — S4

FIG. 1

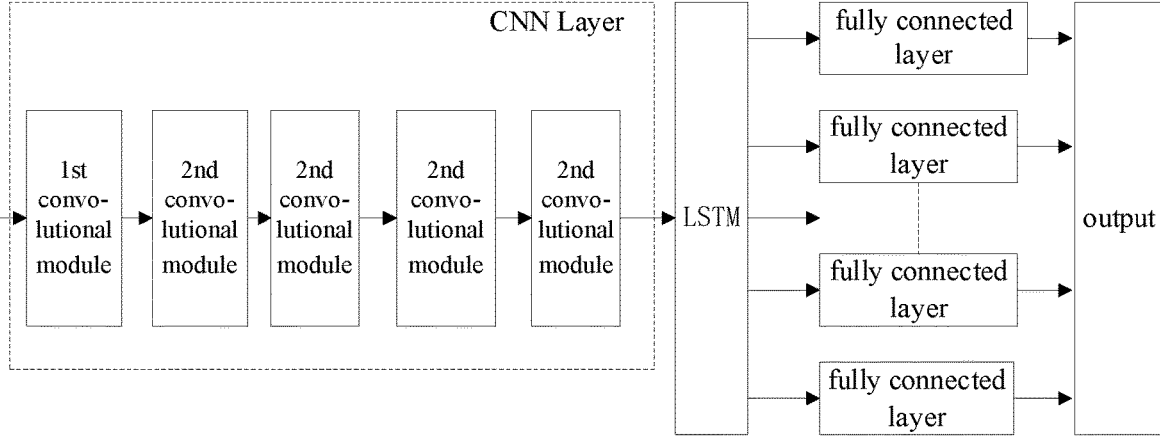

CNN Layer

1st convo-lutional module → 2nd convo-lutional module → 2nd convo-lutional module → 2nd convo-lutional module → 2nd convo-lutional module → LSTM fully connected layer fully connected layer fully connected layer fully connected layer output

FIG. 2

THERMAL-RUNAWAY WARNING METHOD, SYSTEM, AND TERMINAL FOR POWER STATION

CROSS REFERENCE TO RELATED APPLICATION

The present application claims the benefit of priority to Chinese Patent Application No. CN 202211174980.8, entitled "THERMAL-RUNAWAY WARNING METHOD, SYSTEM, AND TERMINAL FOR POWER STATION", filed with CNIPA on Sep. 26, 2022, the disclosure of which is incorporated herein by reference in its entirety for all purposes.

FIELD OF THE INVENTION

The present disclosure generally relates to batteries used in power stations, and in particular to a thermal-runaway warning method, system, and terminal of an energy-storage power station.

BACKGROUND OF THE INVENTION

Energy-storage power stations play a crucial role in the development of new power systems. However, due to reasons such as inadequate safety measures, these stations are prone to fires, causing significant economic damage to power companies and posing a serious threat to people's lives and power companies' properties.

Various factors, both internal and external to the batteries, can lead to thermal runaway in energy-storage power stations. As a result, monitoring the temperature of these power stations is essential for ensuring their safety.

In current technology, the energy storage structures of large-scale power stations are composed of battery modules as stacks-clusters-boxes-cells. Energy-storage power stations collect temperature data from multiple probes within each battery box to monitor temperature changes in the battery module in real-time. This allows power stations to determine if thermal runaway has occurred based on the temperature changes and thermal abuse standards of the battery modules. Thermal runaway can escalate to a complete loss of battery control, fire or explosion in less than ten minutes, making early warning of any abnormalities crucial for safety monitoring. However, current technology has limitations, such as a single battery module is equipped with multiple temperature probes, which makes temperature monitoring based on a single point data unreliable and prone to false alarms.

SUMMARY OF THE INVENTION

The present disclosure provides a thermal-runaway warning method, system, and terminal for a power station, which enable effective warning of thermal runaway for a power station by predicting the temperature of battery modules in the power station.

The thermal-runaway warning method for a power station comprises: obtaining collected data from a battery module in the power station, wherein the collected data comprises temperature values of the battery module acquired by a plurality of temperature measuring devices; normalizing the collected data to obtain a standard dataset; training a combined model of convolutional neural network (CNN) and long-short term memory (LSTM), or for short, CNNLSTM-based temperature predicting model from the standard dataset to generate a trained CNNLSTM-based temperature predicting model; and calculating a predicted temperature value of the battery module within an output time window given by the trained CNNLSTM-based temperature predicting model, and determining whether there is a risk of thermal runaway in the power station based on the predicted temperature value of the battery module.

In one embodiment of the present disclosure, training the CNNLSTM-based temperature predicting model from the standard dataset comprises: constructing the CNNLSTM-based temperature predicting model by combining a CNN layer, an LSTM layer, and fully connected layers, wherein the CNN layer, LSTM layer, and fully connected layers are connected in sequence; intercepting the standard dataset using a sliding window approach to obtain a standard sub-dataset associated with an input time window; and obtaining a sub-group of the collected temperature values within the output time window corresponding to the standard sub-dataset; and training the CNNLSTM-based temperature predicting model based on the standard sub-dataset and the associated sub-group of the collected temperature values to enable the CNNLSTM-based temperature predicting model to obtain the predicted temperature value within the output time window associated with the standard sub-dataset within the input time window.

In one embodiment of the present disclosure, the CNN layer comprises a first convolutional module and at least one second convolutional module connected in sequence, wherein the first convolutional module comprises a first one-dimensional convolutional layer and a first activation layer connected in series, wherein the second convolutional module comprises a second one-dimensional convolutional layer, a batch normalization layer, and a second activation layer connected in series.

In one embodiment of the present disclosure, determining whether there is a risk of thermal runaway in the power station based on the predicted temperature value of the battery module comprises: calculating a reconstruction error of the predicted temperature value; and if the reconstruction error is greater than a predetermined error threshold, concluding that there is a risk of thermal runaway in the power station.

In one embodiment of the present disclosure, calculating the reconstruction error of the predicted temperature value comprises: encoding the predicted temperature value to obtain an encoded temperature value; decoding the encoded temperature value to obtain a decoded temperature value; and calculating a difference between the predicted temperature value and the decoded temperature value, wherein the difference is the reconstruction error of the predicted temperature value.

In one embodiment of the present disclosure, determining whether there is a risk of thermal runaway in the power station based on the predicted temperature value comprises: calculating a deviation value between the predicted temperature value and a corresponding one of the collected temperature values; and when the deviation value is greater than a predetermined deviation threshold, concluding that there is a risk of thermal runaway in the power station.

In one embodiment of the present disclosure, the method further comprises: issuing a warning message when it is determined that there is a risk of thermal runaway in the power station.

The present disclosure further provides a thermal-runaway warning system for a power station, comprising an acquisition module, a normalization module, a training module, and a judgment module; wherein the acquisition module is for obtaining collected data of a battery module comprised in the power station, wherein the collected data comprises temperature values of the battery module acquired by a plurality of temperature measuring devices; wherein the normalization module is for normalizing the collected data to obtain a standard dataset; wherein the training module is for training a CNNLSTM-based temperature predicting model based on the standard dataset to obtain a trained CNNLSTM-based temperature predicting model; the judgment module is for obtaining a predicted temperature value of the battery module within an output time window based on the trained CNNLSTM-based temperature predicting model, and determining whether there is a risk of thermal runaway in the power station based on the predicted temperature value.

The present disclosure further provides a non-transitory storage medium having a computer program stored thereon, wherein the program, when executed by a processor, implements the thermal-runaway warning method for the power station described above.

The present disclosure further provides a thermal-runaway warning terminal for a power station, comprising a processor and a memory; wherein the memory stores a computer program; wherein the processor executes the computer program to cause the thermal-runaway warning terminal of the power station to implement the thermal-runaway warning method for the power station described above.

In summary, the thermal-runaway warning method, system, and terminal for a power station of the present disclosure have the following beneficial effects:

(1) By predicting the temperature of battery modules in the power station, effective early warning of thermal runaway is achieved;

(2) By predicting the temperature of an entire battery module, the temperature of each individual battery cell is effectively monitored, overcoming the limitations of incomplete temperature detection at a single monitoring point;

(3) Dual safety warnings are provided by combining temperature trends with current temperatures, and by offering timely alerts in case of potential thermal abuse or thermal runaway in the power station, ensuring its safe operation.

BRIEF DESCRIPTION OF THE DRAWINGS

FIG. 1 is a flowchart of a thermal-runaway warning method for a power station according to an embodiment of the present disclosure;

FIG. 2 is a block diagram of a CNNLSTM-based temperature predicting model according to an embodiment of the present disclosure;

Figure 3:
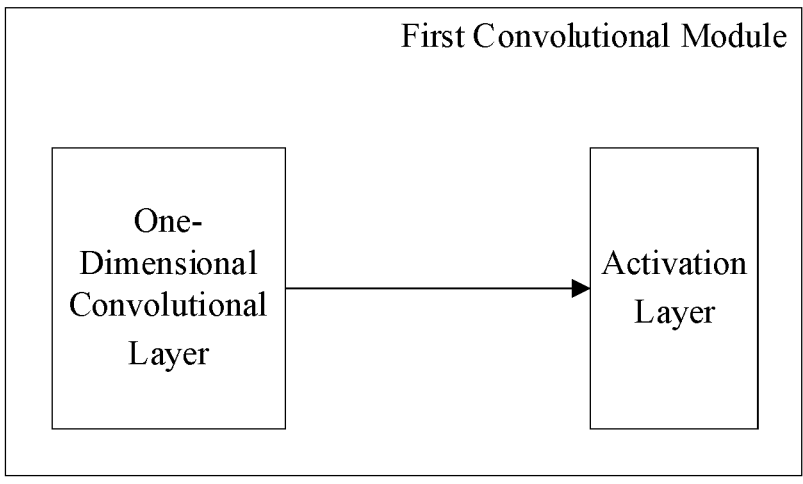
FIG. 3 is a block diagram of a first convolutional module according to an embodiment of the present disclosure.

| Reference Numerals | |
|---|---|
| 51 | Acquisition module |
| 52 | Normalization module |
| 53 | Training module |
| 54 | Judgment module |
| 61 | Processor |
| 62 | Memory |

DETAILED DESCRIPTION

The embodiments of the present disclosure will be described below. Those skilled can easily understand disclosure advantages and effects of the present disclosure according to contents disclosed by the specification. The present disclosure can also be implemented or applied through other different exemplary embodiments. Various modifications or changes can also be made to all details in the specification based on different points of view and applications without departing from the spirit of the present disclosure. It should be noted that the following embodiments and the features of the following embodiments can be combined with each other if no conflict will result.

It should be noted that the drawings provided in this disclosure only illustrate the basic concept of the present disclosure in a schematic way, so the drawings only show the components closely related to the present disclosure. The drawings are not necessarily drawn according to the number, shape and size of the components in actual implementation; during the actual implementation, the type, quantity and proportion of each component can be changed as needed, and the components' layout may also be more complicated.

The present disclosed thermal-runaway warning method, system, and terminal for a power station can predict the temperature of a battery module in a power station by collecting multiple temperature values within a certain time window. This provides effective early warning of thermal runaway, ensuring the safe operation of the power station and making the present disclosure highly practical.

As shown in FIG. 1, as an example, the thermal-runaway warning method for a power station of the present disclosure comprises steps S1-S4:

Step S1: obtaining collected data of a battery module in the power station, wherein the collected data comprises collected temperature values of the battery module collected by a plurality of temperature measuring devices.

Specifically, the power station comprises a plurality of battery modules. A plurality of battery cells forms a battery module when they are encapsulated together by the same housing frame and are connected to the outside by a uniform boundary. For each battery module, temperature-related information is continuously collected at a certain time interval. It should be noted that in the present disclosure, each battery module is provided with a plurality of temperature measuring devices, such as temperature probes to acquire temperature values. Accordingly, the collected data comprises collected temperature values of the battery module collected by the plurality of temperature measuring devices. For example, when eight temperature probes are provided on each battery module, the collected data acquired at each time point may be represented as Y, wherein $\forall y_i \in Y$, $y_i = \{Temp\_j_i\}$, $Temp\_j$ denotes a collected temperature value acquired by a jth temperature probe, and $j \in (1, 8)$. Therefore, the collected data may be represented as a series of data sequentially arranged in order of their acquisition time, and the data at each acquisition time point comprise a plurality of collected temperature values (8 in this case).

Preferably, the collected data may also comprise voltage values, electric current values, and State of Charge (SOC) of the battery module.

Step S2, normalizing the collected data to obtain a standard dataset.

Specifically, in order to simplify subsequent calculation, each of the collected data is normalized so that the values of all the data are in the interval [0,1]. The collected data after normalization then qualify as a standard dataset.

Step S3, training a CNNLSTM-based temperature predicting model based on the standard dataset to obtain a trained CNNLSTM-based temperature predicting model.

Specifically, a combination of multi-step prediction and multi-objective prediction is used to predict the temperature of the battery module. Multi-step prediction refers to a model outputting n predicted values at each prediction. Conversely, single-step prediction refers to a model outputting only one predicted value at each prediction. Multi-target prediction refers to a model outputting multiple predicted feature data at each prediction. Conversely, single-target prediction refers to a model outputting only one predicted feature datum at each prediction. In one example, the CNNLSTM-based temperature predicting model of the present disclosure obtains, at each prediction, predicted temperature values of the battery module at a plurality of future time points, and each predicted temperature value comprises temperature values acquired by a plurality of temperature measuring devices on the battery module.

As an example, training the CNNLSTM-based temperature predicting model based on the standard dataset comprises steps S31-34:

Step S31: constructing the CNNLSTM-based temperature predicting model, wherein the CNNLSTM-based temperature predicting model comprises a CNN layer, an LSTM layer, and fully connected layers, wherein the CNN layer, LSTM layer, and fully connected layers are connected in sequence.

Figure 4:
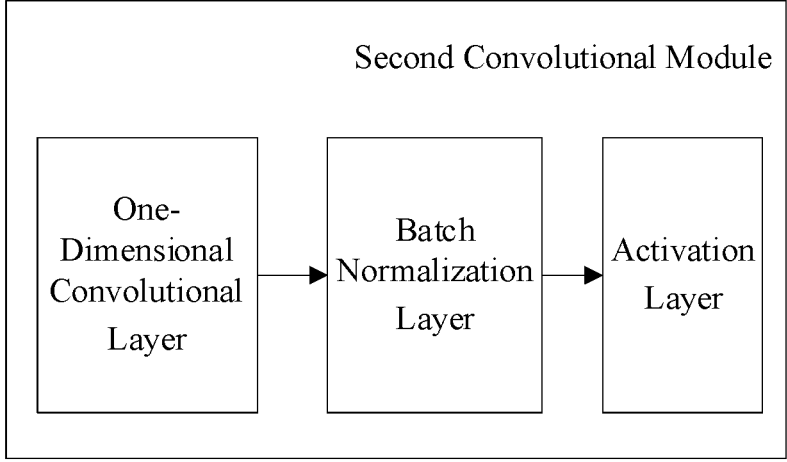
FIG. 4 is a block diagram of a second convolutional module according to an embodiment of the present disclosure.

As shown in FIG. 2, the CNNLSTM-based temperature predicting model of the present disclosure comprises three parts connected in sequence, namely the CNN layer, the LSTM layer and fully connected layers. The CNN layer comprises a first convolutional module and at least one second convolutional module connected in sequence. As shown in FIG. 3, the first convolutional module comprises a first one-dimensional convolutional layer (Conv1D) and a first activation layer connected in series. As shown in FIG. 4, the second convolution module comprises a second one-dimensional convolutional layer, a batch normalization layer, and a second activation layer connected in series. Preferably, the CNN layer comprises one first convolutional module and three second convolutional modules. The number of the fully connected layers may be one or more. When the number of the fully-connected layers is more than one, the multiple fully-connected layers are connected in parallel with each other, and the combination of their outputs constitutes the output of the CNNLSTM-based temperature predicting model.

Step S32: intercepting the standard dataset using a sliding window approach to obtain a standard sub-dataset within an input time window.

Specifically, an input time window is first selected, and the sliding window approach is employed to cause the input time window to slide over the standard dataset, thereby acquiring a plurality of standard sub-datasets. For example, a size of the input time window $window_x$ is 400, and a size of an output time window $window_y$ is 300. The standard dataset is intercepted using the sliding window approach to obtain one standard sub-dataset, represented by $x_{input\_i}$, wherein $x_{input\_i}=[x_i, \ldots, x_{i+window_x}]$, $i \in (0, N-window_x-window_y)$, and N is the number of data items in the standard dataset.

Step S33: obtaining a sub-group of the collected temperature values within the output time window corresponding to the standard sub-dataset.

Specifically, the sub-group of the collected temperature values within the output time window corresponding to the standard sub-dataset is represented by $y_{label}$, wherein $y_{label\_i}=[y_i, \ldots, y_{i+window_y}]$, $i \in (0, N-window_x-window_y)$.

Step S34: training the CNNLSTM-based temperature predicting model based on the standard sub-dataset and the sub-group of the collected temperature values to enable the CNNLSTM-based temperature predicting model to obtain the predicted temperature value within the output time window based on the standard sub-dataset within the input time window.

Specifically, the standard sub-dataset and the corresponding sub-group of the collected temperature values together constitute a dataset D required for training the CNNLSTM-based temperature predicting model, wherein $D=\{x_{input}, y_{label}\}$. The dataset D is divided into a training set, a validating set, and a testing set, and the CNNLSTM-based temperature predicting model is trained based on the training set, the CNNLSTM-based temperature predicting model is validated based on the validating set, and the CNNLSTM-based temperature predicting model is tested based on the testing set. A loss function used in the CNNLSTM-based temperature predicting model is a mean-square-error loss function MSE Loss, i.e., $$loss(y_{label}, y_{pred}) = \frac{1}{window_y \sum_k^{window_y} (y_{label\_k} - y_{pred\_k})^2},$$

wherein k is the size of the output time window, $y_{real}$ is a collected temperature value, and $y_{pred}$ is a predicted temperature value. Preferably, the number of training times is about 100, the learning rate is about 0.002, and the training batch size is 32. After the CNNLSTM-based temperature predicting model reaches the accuracy requirements through training, it can be used to predict temperature values of the battery module in the output time window.

Step S4: obtaining a predicted temperature value of the battery module within the output time window based on the trained CNNLSTM-based temperature predicting model, and determining whether there is a risk of thermal runaway in the power station based on the predicted temperature value.

Specifically, a real-time collected temperature value of the battery module is obtained, and then the predicted temperature value within the output time window corresponding to the real-time collected temperature value is obtained based on the trained CNNLSTM-based temperature predicting model. Any one of the following schemes may be used for determining whether there is a risk of thermal runaway in the power station based on the predicted temperature value:

(1) calculating a reconstruction error of the predicted temperature value; and when the reconstruction error is greater than a predetermined error threshold, determining that there is a risk of thermal runaway in the power station.

A combined encoder-decoder scheme is used to calculate the reconstruction error of predicted temperature values of any one of the temperature measuring devices. First, a certain predicted temperature value is encoded to obtain an encoded temperature value; then the encoded temperature value is decoded to obtain a decoded temperature value; finally, the difference between the predicted temperature value and the decoded temperature value is calculated, and the difference is the reconstruction error of this predicted temperature value.

(2) calculating a deviation value between a predicted temperature value of any of the temperature measuring devices and a corresponding one of the collected temperature values; when the deviation value is greater than a predetermined deviation threshold, determining that there is a risk of thermal runaway in the power station.

It should be noted that when either of the above two schemes finds a risk of thermal runaway, it can be determined that there is a risk of thermal runaway in the power station, at which time a warning message is instantly issued. Preferably, the warning message comprises one or more of a voice message, a text message, a broadcast message, and the like.

Figure 5:
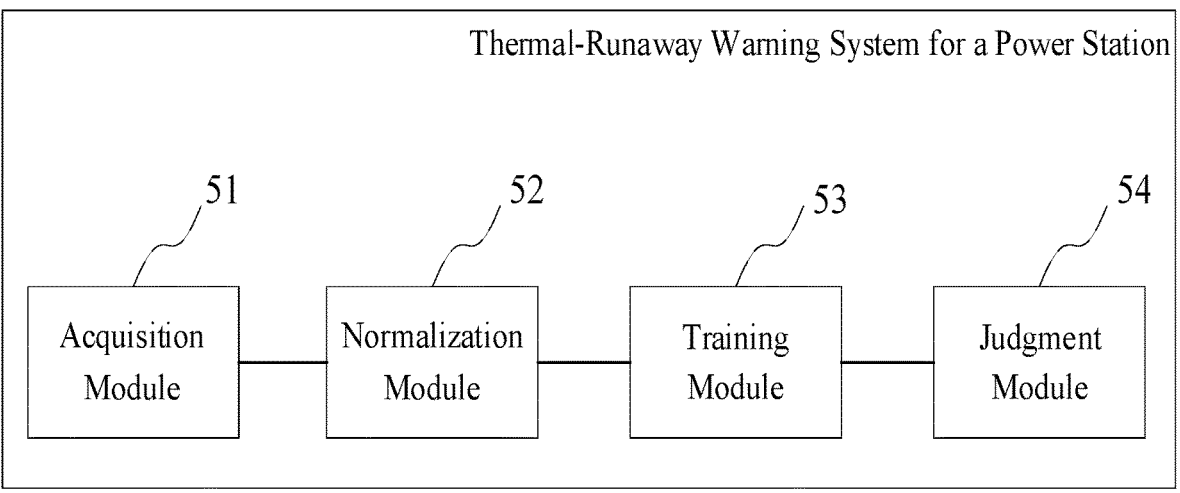
FIG. 5 is a block diagram of a thermal-runaway warning system for a power station according to an embodiment of the present disclosure.

As shown in FIG. 5, the present disclosure further provides a thermal-runaway warning system for a power station; as an example, the thermal-runaway warning system for a power station comprises: an acquisition module 51, a normalization module 52, a training module 53, and a judgment module 54.

The acquisition module 51 is for obtaining collected data of a battery module comprised in the power station, wherein the collected data comprises temperature values of the battery module acquired by a plurality of temperature probes.

Specifically, the power station comprises a plurality of battery modules. A plurality of battery cells form a battery module when they are encapsulated together by the same housing frame and are connected to the outside by a uniform boundary. For each battery module, temperature-related information is continuously collected at a certain time interval. It should be noted that in the present disclosure, each battery module is provided with a plurality of temperature measuring devices, such as temperature probes to collect temperature values. Accordingly, the collected data comprises collected temperature values of the battery module collected by the plurality of temperature measuring devices. For example, when eight temperature probes are provided on each battery module, the collected data acquired at each time point may be represented as Y, wherein $\forall y_i \in Y$, $y_i = \{Temp\_j_i\}$, Temp_j denotes a collected temperature value acquired by a jth temperature probe, and $j \in (1, 8)$. Therefore, the collected data may be represented as a sequence of data sequentially arranged in order of acquisition time, and the data at each acquisition time point comprise a plurality of collected temperature values.

Preferably, the collected data may also comprise voltage values, current values, and SOC of the battery module.

The normalization module 52 is connected to the acquisition module 51, and is for normalizing the collected data to obtain a standard dataset.

Specifically, in order to simplify subsequent calculation, each of the collected data is normalized so that the values of all the data are in the interval [0,1]. The collected data after normalization then qualify as a standard dataset.

The training module 53 is connected to the normalization module 52 and is for training a CNNLSTM-based temperature predicting model based on the standard dataset to obtain a trained CNNLSTM-based temperature predicting model, which is used to obtain a predicted temperature value within an output time window.

Specifically, a combination of multi-step prediction and multi-objective prediction is used to predict the temperature of the battery module. Multi-step prediction refers to a model outputting n predicted values at each prediction. Conversely, single-step prediction refers to a model outputting only one predicted value at each prediction. Multi-target prediction refers to a model outputting multiple predicted feature data at each prediction. Conversely, single-target prediction refers to a model outputting only one predicted feature datum at each prediction. Thus, the CNNLSTM-based temperature predicting model of the present disclosure obtains, at each prediction, predicted temperature values of the battery module at a plurality of future time points, and each predicted temperature value comprises temperature values acquired by a plurality of temperature measuring devices on the battery module.

As an example, training the CNNLSTM-based temperature predicting model based on the standard dataset comprises steps S31-34:

Step S31: constructing the CNNLSTM-based temperature predicting model, wherein the CNNLSTM-based temperature predicting model comprises a CNN layer, an LSTM layer, and fully connected layers, wherein the CNN layer, LSTM layer, and fully connected layers are connected in sequence.

As shown in FIG. 2, the CNNLSTM-based temperature predicting model of the present disclosure comprises three parts connected in sequence, namely the CNN layer, LSTM layer and fully connected layers. The CNN layer comprises a first convolutional module and at least one second convolutional module connected in sequence. As shown in FIG. 3, the first convolutional module comprises a first one-dimensional convolutional layer and a first activation layer connected in series. As shown in FIG. 4, the second convolution module comprises a second one-dimensional convolutional layer, a batch normalization layer, and a second activation layer connected in series. Preferably, the CNN layer comprises one first convolutional module and three second convolutional modules. The number of the fully connected layers may be one or more. When the number of the fully-connected layers is more than one, the multiple fully-connected layers are connected in parallel with each other, and the combination of their outputs constitutes the output of the CNNLSTM-based temperature predicting model.

Step S32: intercepting the standard dataset using a sliding window approach to obtain a standard sub-dataset within an input time window.

Specifically, an input time window is first selected, and the sliding window approach is employed to cause the input time window to slide over the standard dataset, thereby acquiring a plurality of standard sub-datasets. For example, a size of the input time window $window_x$ is 400, and a size of an output time window $window_y$ is 300. The standard dataset is intercepted using the sliding window approach to obtain one standard sub-dataset, represented by $x_{input\_i}$, wherein $x_{input\_i} = [x_i, \ldots, x_{i+window_x}]$, $i \in (0, N-window_x - window_y)$, and N is the number of data items in the standard dataset.

Step S33: obtaining a sub-group of the collected temperature values within the output time window corresponding to the standard sub-dataset.

Specifically, the sub-group of the collected temperature values within the output time window corresponding to the standard sub-dataset is represented by $y_{label}$, wherein $y_{label\_i}=[y_i, \ldots, y_{i+window_y}]$, $i \in (0, N-window_x-window_y)$.

Step S34: training the CNNLSTM-based temperature predicting model based on the standard sub-dataset and the sub-group of the collected temperature values to enable the CNNLSTM-based temperature predicting model to obtain the predicted temperature values within the output time window based on the standard sub-dataset within the input time window.

Specifically, the standard sub-dataset and the corresponding sub-group of the collected temperature values together constitute a dataset D required for training the CNNLSTM-based temperature predicting model, wherein $D=\{x_{input}, y_{label}\}$. The dataset D is divided into a training set, a validating set, and a testing set, and the CNNLSTM-based temperature predicting model is trained based on the training set, the CNNLSTM-based temperature predicting model is validated based on the validating set, and the CNNLSTM-based temperature predicting model is tested based on the testing set. A loss function used in the CNNLSTM-based temperature predicting model is a mean-square-error loss function MSE Loss, i.e., $$\text{loss}(y_{label}, y_{pred}) = \frac{1}{window_y \sum_k^{window_y} (y_{label\_k} - y_{pred\_k})^2},$$

wherein k is the size of the output time window, $y_{real}$ is a collected temperature value, and $y_{pred}$ is a predicted temperature value. Preferably, the number of training times is about 100, the learning rate is about 0.002, and the training batch size is about 32. After the CNNLSTM-based temperature predicting model reaches the accuracy requirements through training, it can be used to predict temperature values of the battery module in the output time window.

The judgment module 54 is connected to the training module 53, and is used for obtaining the predicted temperature value of the battery module within the output time window based on the trained CNNLSTM-based temperature predicting model, and therefore determining whether there is a risk of thermal runaway in the power station based on the predicted temperature value.

Specifically, a real-time collected temperature value of the battery module is obtained, and then the predicted temperature value within the output time window corresponding to the real-time collected temperature value is obtained based on the trained CNNLSTM-based temperature predicting model. Any one of the following schemes may be applied for determining whether there is a risk of thermal runaway in the power station based on the predicted temperature value:

(1) calculating a reconstruction error of the predicted temperature value; and when the reconstruction error is greater than a predetermined error threshold, concluding that there is a risk of thermal runaway in the power station.

A combined encoder-decoder scheme is used to calculate the reconstruction error of predicted temperature values of any one of the temperature measuring devices. First, a certain predicted temperature value is encoded to obtain an encoded temperature value; then the encoded temperature value is decoded to obtain a decoded temperature value; finally, the difference between the predicted temperature value and the decoded temperature value is calculated, and the difference is the reconstruction error of this predicted temperature value.

(2) calculating a deviation value between a predicted temperature value of any of the temperature measuring devices and a corresponding one of the collected temperature values; when the deviation value is greater than a predetermined deviation threshold, concluding that there is a risk of thermal runaway in the power station.

It should be noted that when either of the above two schemes finds a risk of thermal runaway, it can be concluded that there is a risk of thermal runaway in the power station, at which time a warning message is instantly issued. Preferably, the warning message comprises one or more of a voice message, a text message, a broadcast message, and the like.

It should be understood that the division of modules of the above device is only a logical function division, and the modules can be fully or partially integrated into a physical entity or physically separated in the actual implementation. In one embodiment, these modules can all be implemented in the form of software called by processing components. In one embodiment, they can also be all implemented in the form of hardware. In one embodiment, some of the modules can also be realized in the form of software called by processing components, and some of the modules can be realized in the form of hardware. For example, an x module may be a separate processing component, or may be integrated in a chip of the above-mentioned system. In addition, the x module may also be stored in the memory of the above system in the form of program code. The function of the above x module is called and executed by a processing component of the above system. The implementation of other modules is similar. All or part of these modules may be integrated or implemented independently. The processing elements described herein may be an integrated circuit with signal processing capabilities. In the implementation process, each operation of the above method or each of the above modules may be completed by an integrated logic circuit of hardware in the processor element or an instruction in a form of software. The above modules may be one or more integrated circuits configured to implement the above method, such as one or more Application Specific Integrated Circuits (ASICs), one or more Digital Signal Processors (DSPs), or one or more Field Programmable Gate Arrays (FPGAs). When one of the above modules is implemented in the form of calling program codes by a processing component, the processing component may be a general processor, such as a Central Processing Unit (CPU) or other processors that may call program codes. These modules may be integrated and implemented in the form of a system-on-a-chip (SOC).

The present disclosure further provides a non-transitory storage medium having a computer program stored thereon, wherein the program, when executed by a processor, implements the thermal-runaway warning method for the power station described above. The memory may be a Read Only Memory (ROM), Random Access Memory (RAM), magnetic disk, flash disk, memory card, optical disk, or other non-transitory medium that can store program codes.

Figure 6:
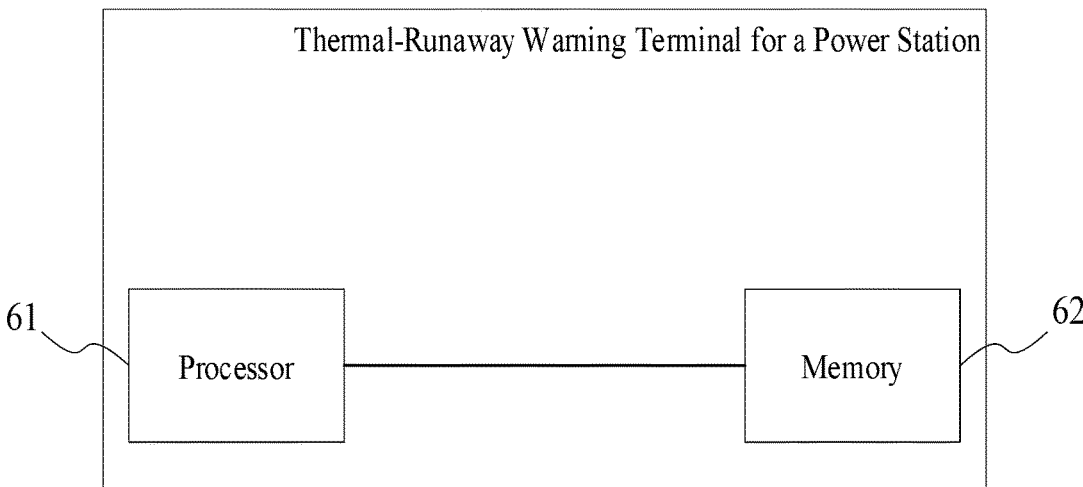
FIG. 6 is a block diagram of a thermal-runaway warning terminal for a power station according to an embodiment of the present disclosure.

As shown in FIG. 6, as an example, the thermal-runaway warning terminal for a power station of the present disclosure comprises a processor 61 and a memory 62.

The memory 62 is configured to store a computer program. The memory 62 comprises one or more of a ROM, RAM, magnetic disk, flash disk, memory card, optical disk, or other non-transitory medium that can store program codes.

The processor 61 is connected to the memory 62, and is for executing the computer program stored in the memory to cause thermal-runaway warning terminal for a power station to execute the thermal-runaway warning method for the power station described above.

Preferably, the processor can be a general processor, comprising a CPU, a Network Processor (NP), etc. It can also be a DSP or an ASIC, an FPGA or other programmable logic devices, discrete gates or transistor logic devices, discrete hardware components.

In summary, the present disclosed thermal-runaway warning method, system, and terminal for the power station are able to realize effective warning of thermal runaway for the power station by predicting the temperatures of battery modules in the power station; by predicting the temperatures of an entire battery module, the temperature of each individual battery cell can by effectively monitored, thereby overcoming the limitations of incomplete temperature detection at a single monitoring point; dual safety warnings are provided by combining temperature trends with current temperatures, and by offering timely alerts in case of potential thermal abuse or thermal runaway in the power station, ensuring its safe operation. Therefore, the present disclosure effectively overcomes various shortcomings in the existing technology and has high industrial utilization value.

The above-mentioned embodiments are merely illustrative of the principle and effects of the present disclosure instead of restricting the scope of the present disclosure. Those skilled in the art can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the claims of the present disclosure.

What is claimed is:

1. A thermal-runaway warning method for a power station, comprising:
    obtaining collected data from a battery module comprised in the power station, wherein the collected data comprises temperature values of the battery module acquired by a plurality of temperature measuring devices;
    normalizing the collected data to obtain a standard dataset;
    training a convolutional neural network and long-short term memory (CNNLSTM)-based temperature predicting model based on the standard dataset to obtain a trained CNNLSTM-based temperature predicting model; and
    obtaining a predicted temperature value of the battery module within an output time window based on the trained CNNLSTM-based temperature predicting model, and determining whether there is a risk of thermal runaway in the power station based on the predicted temperature value.

2. The thermal-runaway warning method for the power station according to claim 1, wherein training the CNNLSTM-based temperature predicting model based on the standard dataset comprises:
    constructing the CNNLSTM-based temperature predicting model, wherein the CNNLSTM-based temperature predicting model comprises a CNN layer, an LSTM layer, and a fully connected layer, connected in sequence;
    intercepting the standard dataset using a sliding window approach to obtain a standard sub-dataset within an input time window;

obtaining a sub-group of the collected temperature values within the output time window corresponding to the standard sub-dataset obtained within the input time window; and
    training the CNNLSTM-based temperature predicting model based on the standard sub-dataset and the sub-group of the collected temperature values to enable the CNNLSTM-based temperature predicting model to obtain the predicted temperature value within the output time window based on the standard sub-dataset obtained within the input time window.

3. The thermal-runaway warning method for the power station according to claim 2, wherein the CNN layer comprises a first convolutional module and at least one second convolutional module connected in sequence, wherein the first convolutional module comprises a first one-dimensional convolutional layer and a first activation layer connected in series, wherein the at least one second convolutional module comprises a second one-dimensional convolutional layer, a batch normalization layer, and a second activation layer connected in series.

4. The thermal-runaway warning method for the power station according to claim 1, wherein determining whether there is the risk of thermal runaway in the power station based on the predicted temperature value comprises:
    calculating a reconstruction error of the predicted temperature value; and
    when the reconstruction error is greater than a predetermined error threshold, determining that there is the risk of thermal runaway in the power station.

5. The thermal-runaway warning method for the power station according to claim 4, wherein calculating the reconstruction error of the predicted temperature value comprises:
    encoding the predicted temperature value to obtain an encoded temperature value;
    decoding the encoded temperature value to obtain a decoded temperature value; and
    calculating a difference between the predicted temperature value and the decoded temperature value, wherein the difference is the reconstruction error of the predicted temperature value.

6. The thermal-runaway warning method for the power station according to claim 1, wherein determining whether there is the risk of thermal runaway in the power station based on the predicted temperature value comprises:
    calculating a deviation value between the predicted temperature value and a corresponding one of the collected temperature values; and
    when the deviation value is greater than a predetermined deviation threshold, concluding that there is the risk of thermal runaway in the power station.

7. The thermal-runaway warning method for the power station according to claim 1, further comprising: issuing a warning message when it is concluded that there is the risk of thermal runaway in the power station.

8. A thermal-runaway warning system for a power station, comprising an acquisition module, a normalization module, a training module, and a judgment module;
    wherein the acquisition module obtains collected data of a battery module comprised in the power station, wherein the collected data comprises temperature values of the battery module acquired by a plurality of temperature measuring devices;
    wherein the normalization module normalizes the collected data to obtain a standard dataset;

wherein the training module trains a CNNLSTM-based temperature predicting model based on the standard dataset to obtain a trained CNNLSTM-based temperature predicting model; and wherein the judgment module obtains a predicted temperature value of the battery module within an output time window based on the trained CNNLSTM-based temperature predicting model, and determining whether there is a risk of thermal runaway in the power station based on the predicted temperature value.

9. A non-transitory storage medium having a computer program stored thereon, wherein the computer program, when executed by a processor, implements the thermal-runaway warning method for the power station according to claim 1.

10. A terminal for communicating a thermal-runaway warning message for a power station, comprising a processor and a memory;

wherein the memory is configured to store a computer program;

wherein the processor is for executing the computer program to cause the thermal-runaway warning message communicated on the terminal for the power station to implement the thermal-runaway warning method for the power station according to claim 1.

\* \* \* \* \*